(12) United States Patent
Beadell et al.

(10) Patent No.: US 8,795,070 B2
(45) Date of Patent: Aug. 5, 2014

(54) SINGLE ACCESS MECHANISM FOR GAMING DEVICE

(75) Inventors: John Leagh Beadell, Sparks, NV (US); Russell Chudd, Reno, NV (US); Kay Vetter, Reno, NV (US)

(73) Assignee: IGT, Las Vegas, NV (US)

( * ) Notice: Subject to any disclaimer, the term of this patent is extended or adjusted under 35 U.S.C. 154(b) by 1983 days.

(21) Appl. No.: 11/558,086

(22) Filed: Nov. 9, 2006

(65) Prior Publication Data

US 2008/0113818 A1 May 15, 2008

(51) Int. Cl.
*E05B 65/44* (2006.01)
(52) U.S. Cl.
USPC .................................. 463/29; 463/46; 70/78
(58) Field of Classification Search
USPC .............................. 463/46, 29; 340/5.6; 70/78
See application file for complete search history.

(56) References Cited

U.S. PATENT DOCUMENTS

| | | | |
|---|---|---|---|
| 5,588,317 A | 12/1996 | Bianco | |
| 6,439,996 B2 | 8/2002 | LeMay et al. | |
| 6,641,483 B1 | 11/2003 | Luciano et al. | |
| 6,788,997 B1* | 9/2004 | Frederick | 700/236 |
| 7,066,816 B2* | 6/2006 | Gauselmann | 463/29 |
| 7,758,428 B2 | 7/2010 | Mattice et al. | |
| 2004/0002381 A1* | 1/2004 | Alcorn et al. | 463/37 |
| 2005/0077995 A1* | 4/2005 | Paulsen et al. | 340/5.6 |

* cited by examiner

*Primary Examiner* — Werner Garner
(74) *Attorney, Agent, or Firm* — Foley & Lardner LLP

(57) ABSTRACT

Provided in embodiments of the present invention is an access mechanism that provides access to a plurality of internal portions of a gaming device through a plurality of securing mechanisms. In one embodiment, a gaming device includes first and second internal cabinet portions, a first interface device, a second interface device, and an actuator unit. The first and second interface devices secure access to the first and second internal cabinet portions, respectively. The actuator unit is structured to allow access to the first secured cabinet portion in response to a first valid key being applied to the first interface device and to allow access to the second secured cabinet portion in response to a second valid key being applied to the second interface device.

12 Claims, 9 Drawing Sheets

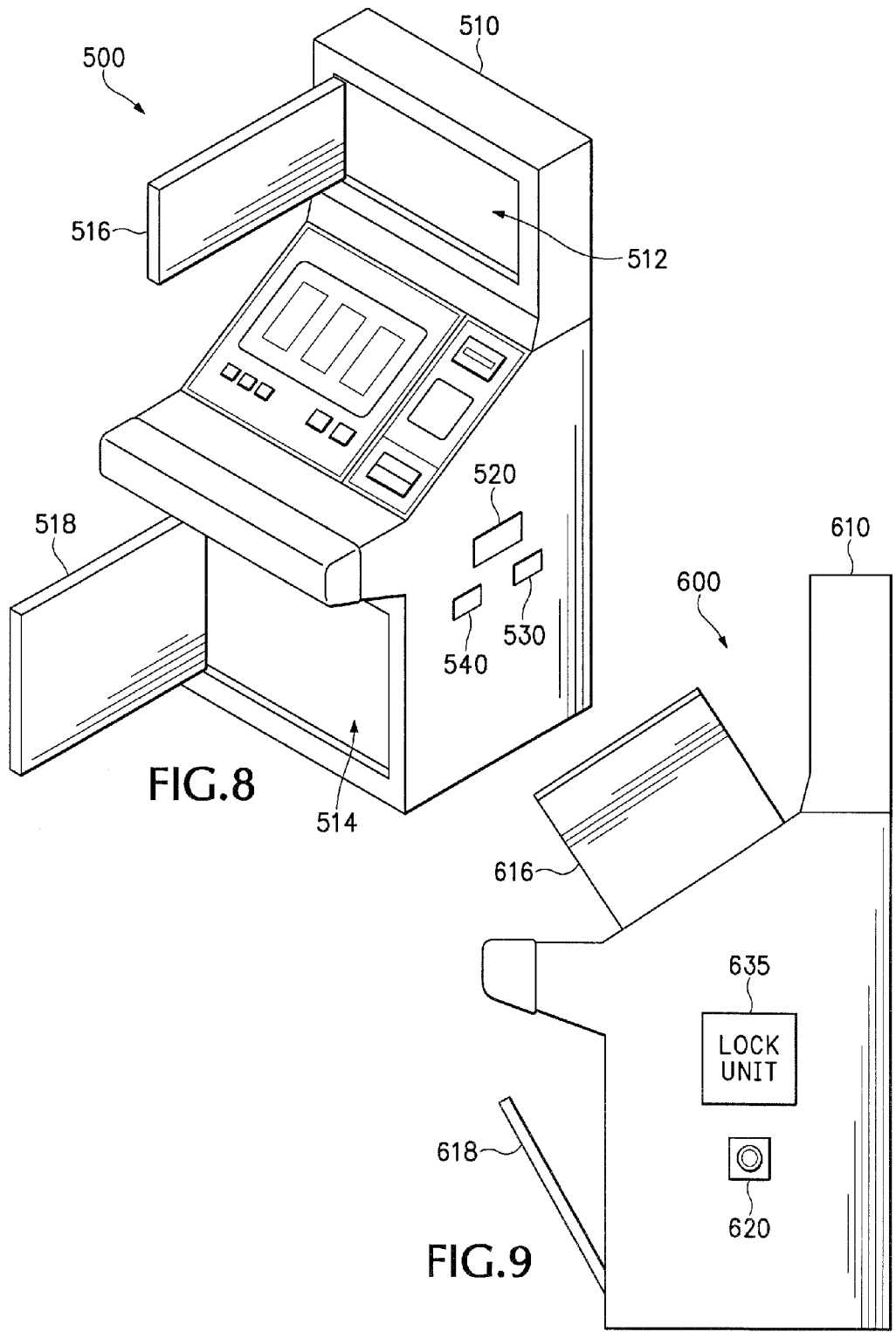

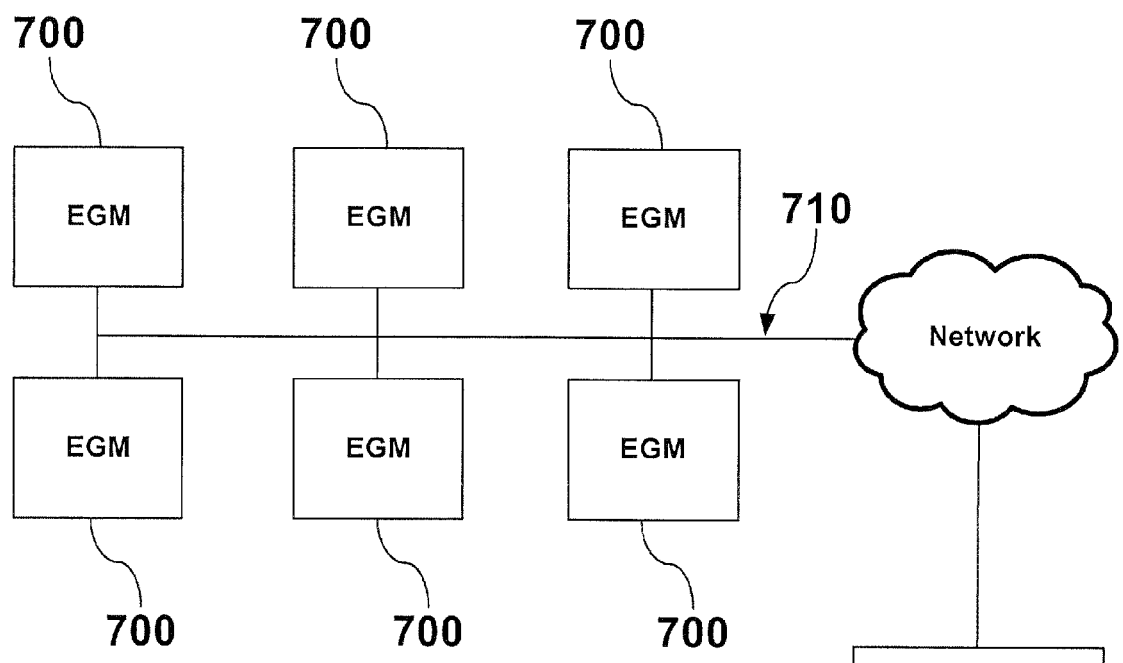
FIG.10
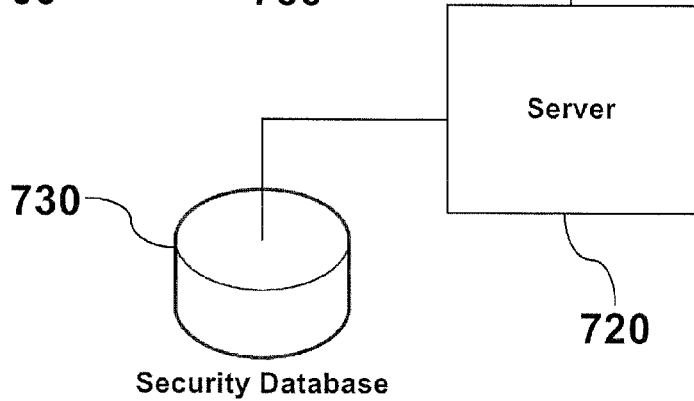

SINGLE ACCESS MECHANISM FOR GAMING DEVICE

CROSS REFERENCE TO RELATED APPLICATIONS

Commonly assigned U.S. patent application Ser. No. 11/598,261, Beadell et al., filed concurrently herewith, for GAMING MACHINE WITH CONSOLIDATED PERIPHERALS, Ser. No. 11/598,252, Beadell et al., filed concurrently herewith, for GAMING MACHINE WITH ADJUSTABLE BUTTON PANEL, Ser. No. 11/595,803, Beadell et al., filed concurrently herewith, for CONTROLLABLE ARRAY OF NETWORKED GAMING MACHINE DISPLAYS, Ser. No. 11/598,216, Beadell et al., filed concurrently herewith, for BUTTON PANEL CONTROL FOR A GAMING MACHINE, Ser. No. 11/598,254, Beadell et al., filed concurrently herewith, for PERSONALIZATION OF VIDEO AND SOUND PRESENTATION ON A GAMING MACHINE, Ser. No. 11/598,253, Beadell et al., filed concurrently herewith, for SPEAKER ARRANGEMENT AND CONTROL ON A GAMING MACHINE, and Ser. No. 11/598,251, Beadell et al., filed concurrently herewith, for GAMING MACHINE WITH VERTICAL DOOR-MOUNTED DISPLAY.

The disclosures of the above-listed applications are all incorporated herein by reference in their entirety for all purposes.

FIELD OF THE INVENTION

The present invention relates generally to an access mechanism for a gaming device, and more particularly to a single pin access mechanism that provides access to a plurality of internal portions of a gaming device through a plurality of securing mechanisms.

BACKGROUND OF THE INVENTION

Although gaming has existed in some form for many years, its present familiar form of slot machines, table games, sports books, etc. has mainly developed in the last few decades, in which gaming has come under careful state regulation. One aspect of this regulation for gaming devices is the need to protect internal portions of the devices so that players do not interfere with their operation in attempts to receive payouts by means other than wagering. To accomplish this, gaming machine manufacturers have worked closely with gaming operators, such as casinos, to develop security systems for gaming machines that conform to the necessary security regulations while still providing a system where a multitude of operators can have reasonably easy access to portions of the gaming devices for tasks such as repairs, coin hopper fills, cashless ticket paper replacement, and even interchanging game processors.

In gaming devices such as slot machines or video poker, a simple method of meeting the above needs is to provide an access door on a gaming device that is secured by a lock. This allows gaming operator personnel to access the internal portions of the gaming device by carrying keys while securing these internal portions from players. However, it was realized that some of the internal portions of the gaming devices needed to be accessed often, such as the coin hopper and cashless ticket paper, while other portions required access less often, such as the gaming device processor. This also created a security problem in establishments operating more than a few gaming devices, such as casinos, because upper level casino employees were too busy to respond to all of the minor access needs of the gaming devices, while lower level casino floor employees, such as slot attendants, did not have the proper clearance to have access to the gaming device processors. More specifically, because altering the payout characteristics of a gaming device is more easily accomplished with access to critical gaming components, such as a gaming processor and local memory, there is a need to have an increased security level for these components as compared to less critical components, such as ticket printers and coin hoppers.

To address the above problem, conventional gaming devices have been implemented in at least two manners. One manner is to provide a second secured portion inside the internal portion of the gaming device that is accessible to all levels of casino personnel. This has been implemented by using an internal security door with a second lock. Thus, to access these portions of the gaming device, casino personnel would need a first key to gain access to the main internal portion of the gaming device and then a second key to open the second secured portion inside the main internal portion. A second manner of providing this additional security is to include two internal portions of the gaming device separated from each other, where each internal area was accessible through a separate door using a separate lock and separate means of opening each door. Here, lower level casino personnel, such as slot attendants, would have a key to only the less secure portion of the gaming device. The upper level casino personnel and slot technicians would have the other key to access the higher security level portion, but would also need to carry the second key to access any of the gaming components in the other portion of the gaming device.

However, each of these conventional manners of addressing the above problem comes with its own issues. In the first scenario where the gaming device has a second internal secured portion in a main internal portion, an upper level casino employee or a slot technician who needs access to this second internal secured portion is required to have means to unlock both secured areas. In addition, extra time is needed to gain access to both areas. Since increased player time at a gaming device is a primary focus of gaming operations, this extra time in gaining access, and complications arising from having only one of the access keys, takes away from player time and is undesirable. Similarly, in the second scenario with the separate doors, upper level casino personnel and slot technicians would need to carry keys or other means to access both internal portions of the gaming device. Also, the two separate means of opening each door increases service time on the machine and must both be located in a convenient place on the gaming machine to provide access on a crowded gaming floor where gaming machines are often located in close proximity to each other. These and other problems in the conventional gaming devices are addressed by embodiments of the present invention.

SUMMARY OF THE INVENTION

Embodiments of the present invention provide an access mechanism that provides access to a plurality of internal portions of a gaming device through a plurality of securing mechanisms. In one embodiment, a gaming device includes first and second internal cabinet portions, a first interface device, a second interface device, and an actuator unit. The first interface device is structured to secure access to the first internal cabinet portion and the second interface device is structured to secure access to the second internal cabinet portion. The actuator unit is structured to allow access to the first secured cabinet portion in response to a first valid key being applied to the first interface device and to allow access to the second secured cabinet portion in response to a second valid key being applied to the second interface device.

BRIEF DESCRIPTION OF THE DRAWINGS

FIG. 8 illustrates a gaming device according to another embodiment of the present invention.

FIG. 9 illustrates a gaming device according to yet another embodiment of the present invention.

FIG. 10 illustrates a networked access system according to still another embodiment of the present invention.

DETAILED DESCRIPTION

Figure 1:
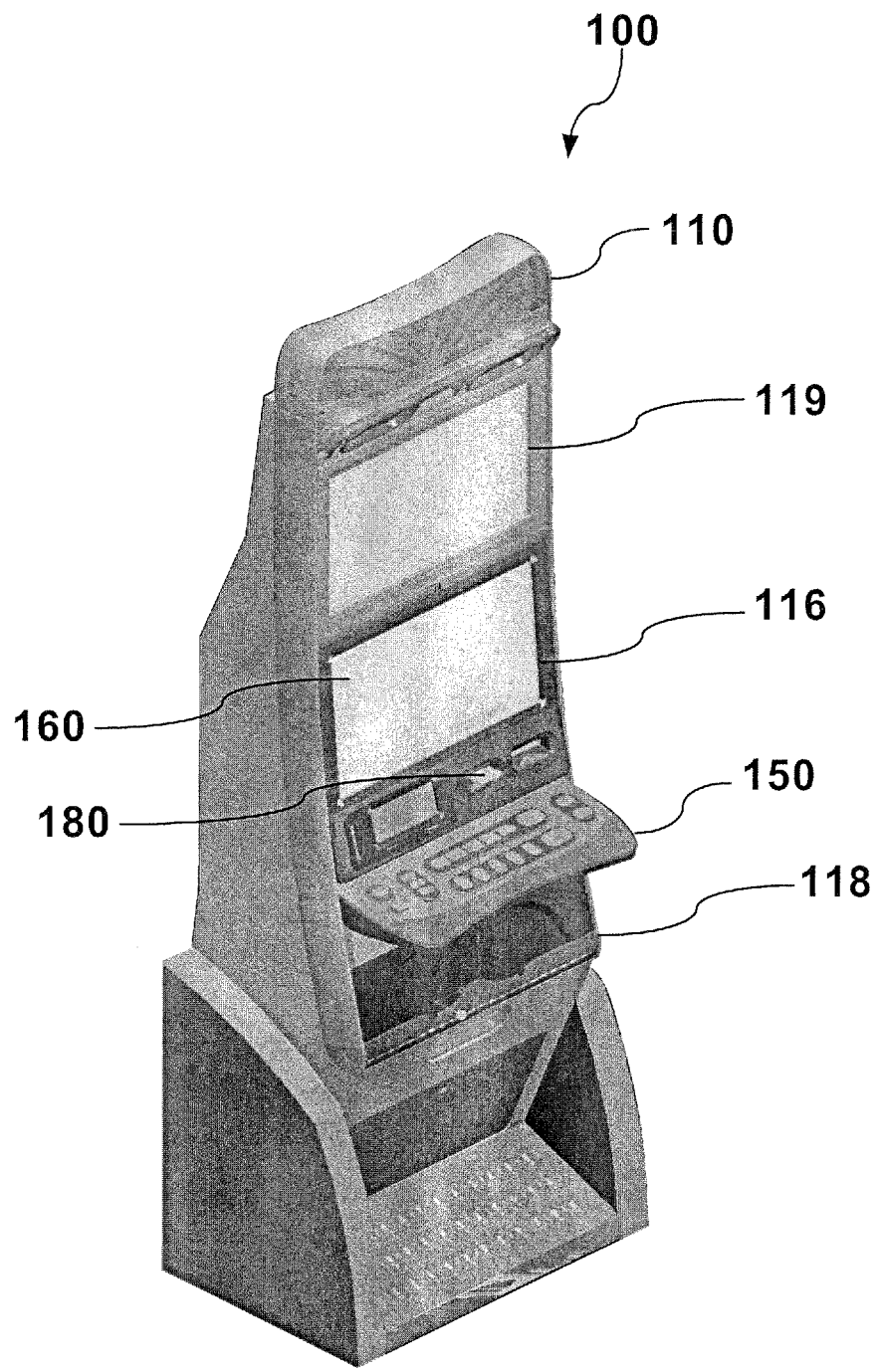
FIG. 1 illustrates a gaming device according to an embodiment of the present invention.

To address the problems discussed above and other problems, embodiments of the present invention are directed to an access mechanism that provides access to a plurality of internal portions of a gaming device through a plurality of securing mechanisms. Some of these embodiments are described below in detail, and in addition, some specific details are shown for purposes of illustrating the inventive principles. However, numerous other arrangements may be devised in accordance with the inventive principles of this patent disclosure. Thus, while the present invention is described in conjunction with the specific embodiments illustrated in the drawings, it is not limited to these embodiments or drawings. Rather, it is intended to cover alternatives, modifications, and equivalents that come within the scope and spirit of the inventive principles set out in the appended claims. Further, well known processes have not been described in detail in order not to obscure the present invention. Thus, the inventive principles are not limited to the specific details disclosed herein.

Figure 2:
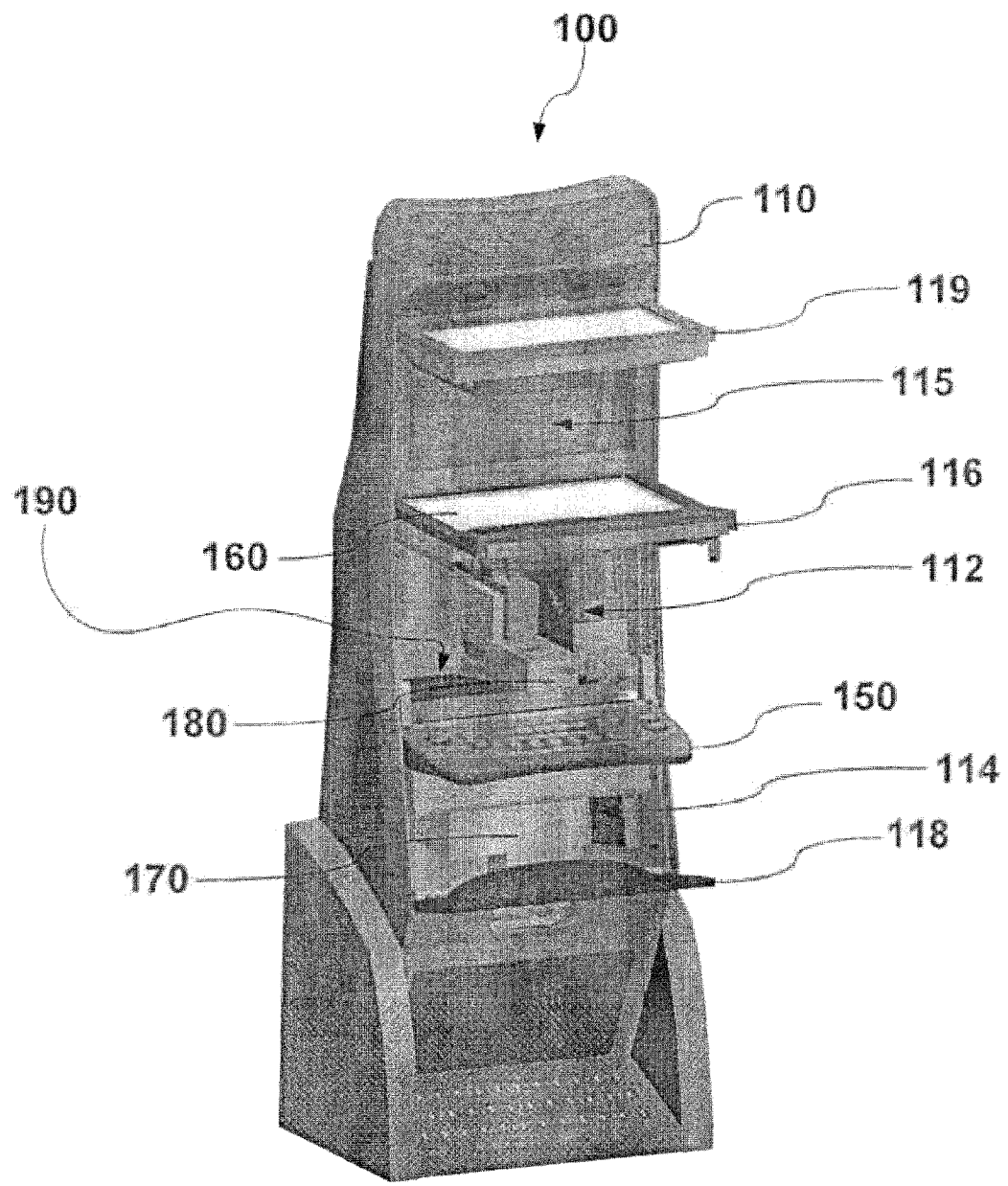
FIG. 2 illustrates another view of the gaming device illustrated in FIG. 1.
Figure 3:
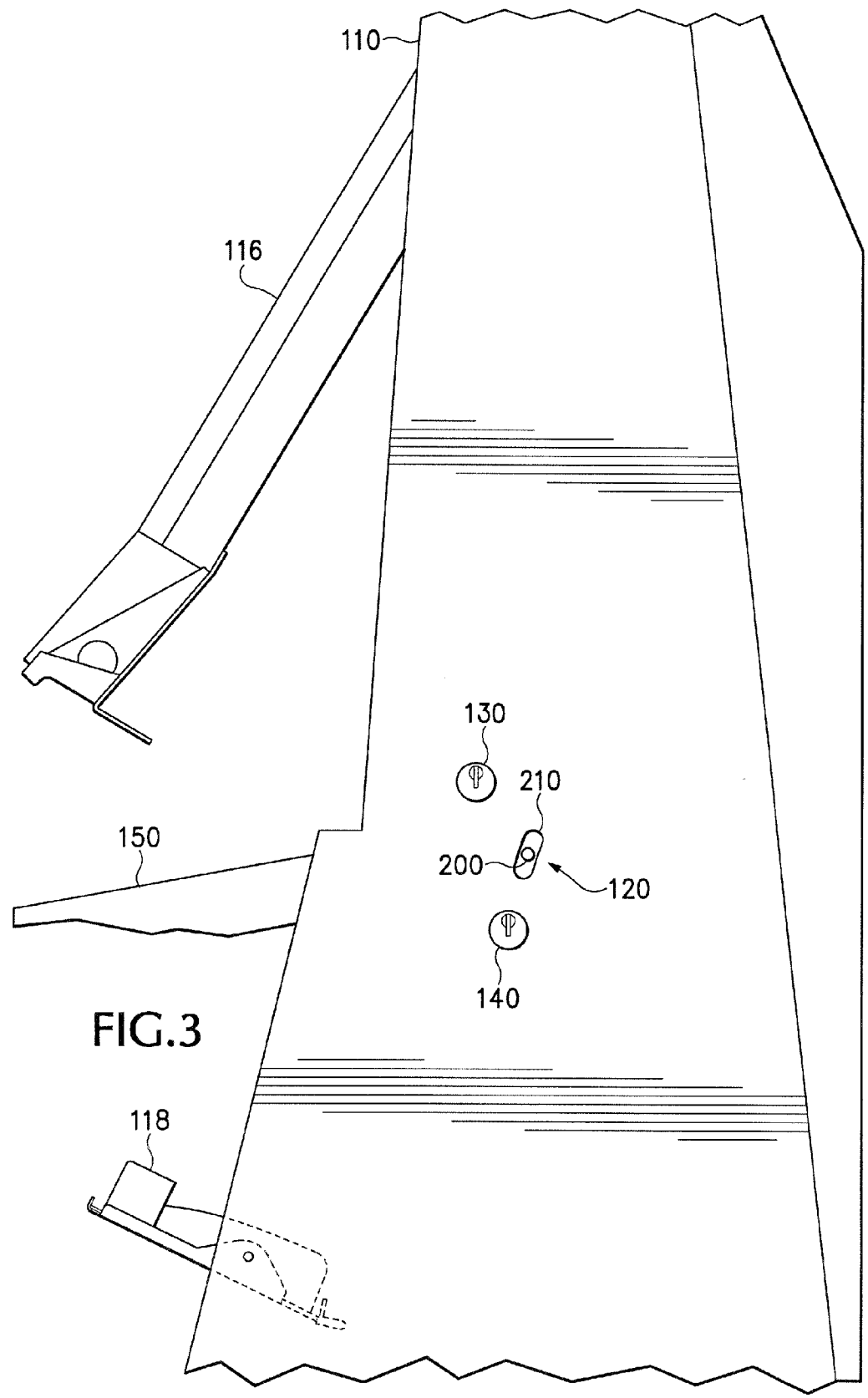
FIG. 3 illustrates a side view of the gaming device illustrated in FIG. 1.

FIGS. 1-7 illustrate a gaming device according to an embodiment of the present invention. FIGS. 1-3 illustrate an overview of this embodiment of the present invention with FIG. 1 illustrating a first view of the gaming device according to an embodiment of the present invention, FIG. 2 illustrating another view of the gaming device illustrated in FIG. 1, and FIG. 3 illustrating a side view of the gaming device illustrated in FIG. 1.

Referring to FIGS. 1-3, a gaming device 100 is housed in a gaming cabinet 110 and may include a first access door 116 that provides access to a first internal cabinet portion 112, a second access door 118 that provides access to a second internal cabinet portion 114, and a third access door 119 that provides access to a third internal cabinet portion 115. The gaming device may also include some peripheral interface devices such as a player control console 150 to allow the player to interact with the gaming device 100, a monitor 160 to display game play and gaming graphics, and various other peripheral interface devices including a player tracking card reader 180, a bill acceptor/validator (not indicated), and the like.

As mentioned above, many of the gaming components necessary to keep the operation of a gaming device, such as gaming device 100, running efficiently need to be accessible for slot attendants, slot technicians, and other employees, but secured from players. In the embodiment illustrated in FIGS. 1-3, many of these gaming components are located in the first, second, and third internal cabinet portions 112, 114, and 115, which can be respectively accessed through the first, second, and third access doors 116, 118, and 119. Also, as different gaming components may have different levels of security associated with them, it is desirable to have separate securing means to prevent access to separate internal portions where gaming components of different security levels are located.

Referring again to FIGS. 1-3, the gaming cabinet 110 may have lower security gaming components, such as a player tracking card reader 180 located in the first internal cabinet portion 112, and higher security gaming components, such as a gaming device processor 170 located in the second internal cabinet portion. The lower security components are typically the components that have less of an impact on the play of the gaming device 100. Also, the lower security components typically need to be accessed more frequently than the higher security components. Examples of lower security components include such components as a bill acceptor/validator, coin hopper, cashless ticket paper supply and printer, player tracking card reader, and other components of gaming devices that may be tangential to the actual game control of the gaming device. On the other hand, the higher security components are typically the components that have a more direct impact on the actual game play, and are the components that may be tampered with to increase payouts or otherwise alter game play of the machine. Examples of these higher security components may include the game processor, local memory, and gaming network circuitry.

To further restrict access between the first and second internal cabinet portions 112, 114, some embodiments of the present invention may include a security panel 190 provided between the first and second internal cabinet portions 112, 114. This security panel may include a solid layer of sheet metal or other barrier to prevent access from the first internal cabinet portion 112 to the second internal cabinet portion 114. This may insure that only those operators with proper security clearance have access to each of the first and second internal cabinet portions 112, 114.

In the embodiment of the present invention illustrated in FIGS. 1-3, the first access door 116 includes a flat panel LCD monitor, which displays visual images to the player during play of the gaming device 100. The second access door 118 of this example gaming device 100 may be a belly door located under the player control console 150. The third access door 119 may provide access to a third cabinet portion 115, where the third cabinet portion includes access to lighting and electronics for an informational panel that may be included on the third access door 119.

Referring to FIG. 2, the embodiment of the gaming device 100 illustrated in FIG. 1 has its first, second, and third access doors 116, 118, 119 opened. The first access door 116 swings upward to provide access to the first internal cabinet portion 112. As discussed above, the first internal cabinet portion may include lower security gaming components, such as bill acceptor/validator 180. The second access door 118 swings downward to provide access to the second internal cabinet portion 114. As discussed above, the second internal cabinet portion may include higher security gaming components, such as game processor 170.

The third access door 119 swings upward to provide access to the third internal cabinet portion 115. In this embodiment, the third internal cabinet portion does not contain any higher security components than the first internal cabinet portion and may thus be accessible with the first internal cabinet portion member. That is, the third internal cabinet portion 115 may not have a security barrier between it and the first internal cabinet portion 112. In this case the third access door 119 may be opened by a latch accessible through the first internal cabinet portion 112. However, in other embodiments, the third internal cabinet portion 115 may include higher security components, and may thus have a security barrier between it and the first internal cabinet portion 112.

To protect the internal gaming components in the first and second internal cabinet portions 112, 114, embodiments of the gaming device 100 may include first and second interface devices 130, 140 to respectively secure the first and second access doors 116, 118. In addition, an actuator unit 120 may be included to allow access to the first cabinet portion 112 in response to a first valid key (not shown) applied to the first interface device 130 and to allow access to the second cabinet portion 114 in response to a second valid key (not shown) applied to the second interface device 140.

Referring to FIG. 3, the first and second interface devices 130, 140 in this embodiment of the gaming device 100 each include a pin and tumbler lock to prevent access to the first and second internal cabinet portions 112, 114. As discussed above, the first and second interface devices 130, 140 may prevent this access to the first and second internal cabinet portions 112, 114 by respectively preventing the first and second access doors 116, 118 from being opened without a proper key being used to disable the corresponding interface device. However, the first and second interface devices 130, 140 are not limited to pin and tumbler locks; rather in some embodiments, the first and second interface devices 130, 140 may include tubular, or other mechanical locking mechanisms. In these embodiments, the keys to open the first and second interface devices 130, 140 may be mechanical keys with specific grooves or notches that align with the locking elements of the first and second interface devices 130, 140 to unlock or disable them.

In other embodiments, the first and second interface devices 130, 140 may be electronic or magnetic based locking mechanisms. In these embodiments, the electronic locking mechanism may be unlocked or disabled by a key card containing proper passive circuitry, or other electronic key technology such as cell phone signals, driver license chips, or the like. Also in these embodiments, the magnetic based locking mechanism may include magnetic card readers, such as swipe readers and slot readers where a magnetic strip on a card can be read by swiping it through a slot on the swipe readers or read by inserting the card in the slot readers. In still other embodiments, the first and second interface devices 130, 140 may include biometric security devices where access is granted upon the reading of a proper fingerprint, voice scan, and the like.

As mentioned above, the actuator unit 120 is structured to allow access to the first internal cabinet portion 112 in response to a first valid key being applied to the first interface device 130 and to allow access to the second internal cabinet portion 114 in response to a second valid key being applied to the second interface device 140. That is, the actuator unit 120 can be operated to open the first access door 116 when a valid key has been used to unlock or disable the first interface device 130. Similarly, the actuator unit 120 can be operated to open the second access door 118 when a valid key has been used to unlock or disable the second interlace device 140.

Referring again to FIG. 3, the actuator unit 120 in this embodiment of the gaming device 100 includes a pin 200 protruding through a slot 210 in the sidewall of the gaming cabinet 110. The protruding pin 200 of the actuator unit 120 may be moved in a first direction along the slot 210 (substantially upward here) or in a second direction opposite to the first direction along the slot 210 (substantially downward here). Further description of the structure and operation of the first and second interface devices 130, 140 and the actuator unit 120 will be provided in conjunction with enlarged views of an example access system illustrated in FIGS. 4-7.

In the embodiments where the third internal cabinet portion 115 is separated from the first internal cabinet portion, the third internal cabinet portion may be secured by a third interface device (not shown) and be operable by the common actuator unit 120 or a separate actuator unit (not shown).

Figure 4:
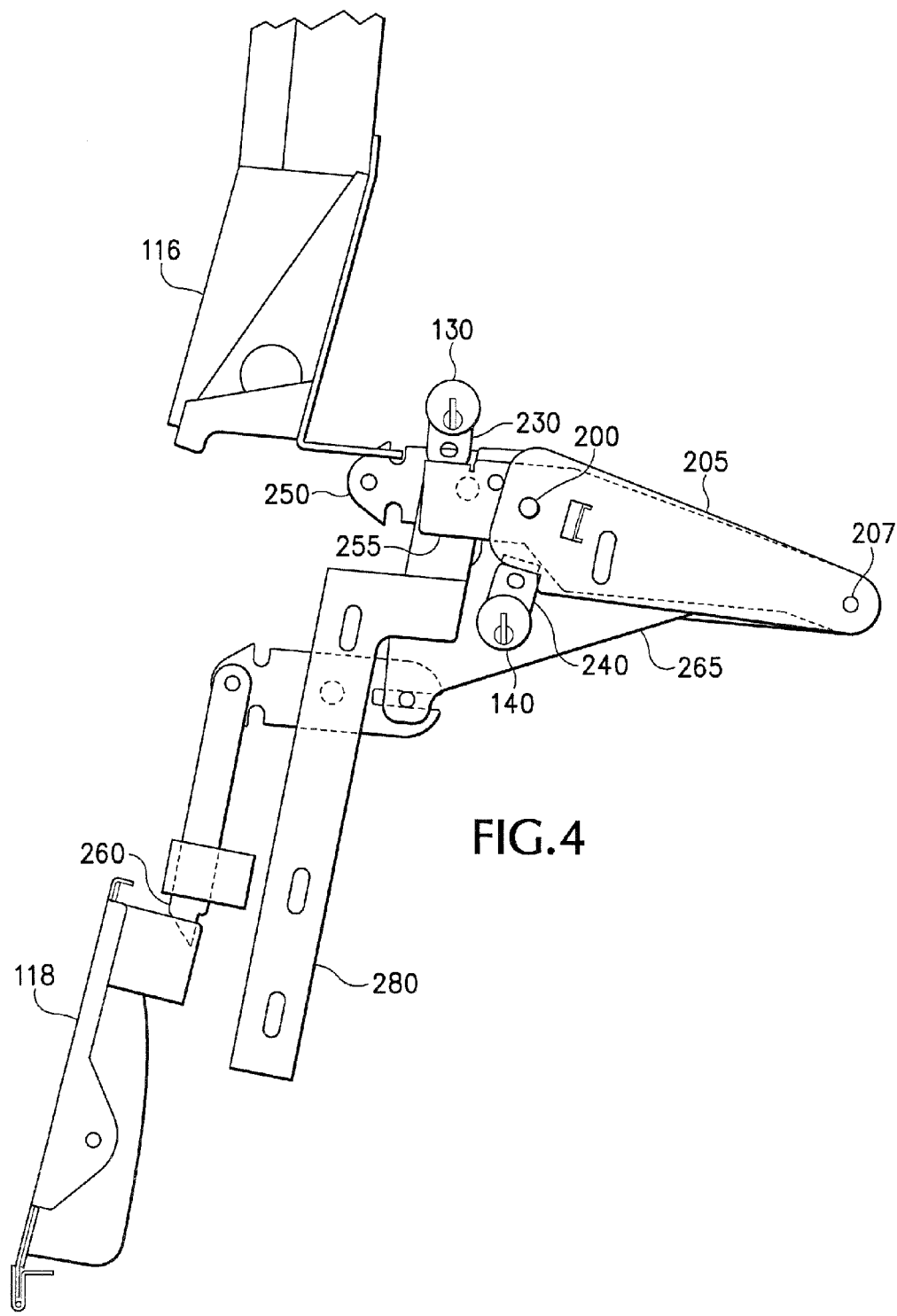
FIG. 4 illustrates an enlarged view of an example access system in a locked position inside the cabinet of the gaming device illustrated in FIG. 3.

FIGS. 4-7 illustrate enlarged views of an example access system inside the cabinet 110 of the gaming device 100 illustrated in FIG. 3. FIG. 4 illustrates an enlarged view of the example access system in a locked position.

Referring to FIG. 4, the first access door 116 is secured in a closed position with a first latch 250 and second access door 118 is secured in a closed position with a second latch 260. The protruding pin 200 that protrudes through the slot 210 in the gaming cabinet 110 as illustrated in FIG. 3 may be attached to a pin mechanism 205 that pivots about a rotation point 207. The pin mechanism 205 may pivot about the rotation point as allowed by the structure of the slot 210 shown in FIG. 3. The first latch 250 is connected to the pin mechanism 205 through a first connection link 255, where fastening means, such as pins, bolts, or welds (not visible) are used to connect these structures. The second latch 260 is connected to the pin mechanism 205 through a second connection link 265, where additional fastening means (not visible) are used to connect these structures.

As indicated above, the pin mechanism 205 may be manipulated in two different manners to respectively allow access to the first and second internal cabinet portions 112, 114. That is, the pin mechanism 205 may be structured to operate the first latch 250 such that it disengages the first access door 116 when manipulated in a first manner and structured to operate the second latch 260 such that it disengages the second access door 118 when manipulated in a second manner. These operations will be further described in detail in conjunction with FIGS. 5 and 6.

To prevent the pin mechanism from being manipulated in the first or second manner, this embodiment of the gaming device 100 includes the first interface device 130 being located above the pin mechanism 205 and the second interface device 140 being located under the pin mechanism 205. Further in this embodiment, the first interface device 130 may include a first cam portion 230 to prevent the pin mechanism 205 from being manipulated in the first manner and the second interface device 140 may include a second cam portion 240 to prevent the pin mechanism 205 from being manipulated in the second manner. More specifically, the first cam portion 230 of the first interface device 130 may prevent the pin mechanism 205 from being manipulated along the slot 210 in the first direction (substantially upward) when the first interface device 130 is in a locked position. Similarly, the second cam portion 240 of the second interface device 140 may prevent the pin mechanism 205 from being manipulated along the slot 210 in the second direction (substantially downward) when the second interface device 140 is in a locked position. In some embodiments, the first cam portion 230 may directly engage the first connection link 255 to prevent manipulation of the pin mechanism 205 in the first direction and the second cam portion 240 may directly engage the second connection link 265 at a protruding tab from the second connection link 265 to prevent manipulation of the pin mechanism 205 in the second direction. The pin mechanism 205 may further include retention devices (not shown) such as springs to hold it in a neutral middle position in the slot 205 so that it will not move until manipulated by an operator when either the first or second interface units 130, 140 are unlocked or disabled.

Although the first latch is illustrated as a rocker hook latch that engages a hole in a portion of the first access door 116, the first latch 250 and securing engagement may be formed in a variety of ways. Likewise, although the second latch 260 is illustrated as a bar latch that engages a protruding hollow box shaped portion of the second access door 118, the second latch 260 and securing engagement may be formed in a variety of ways. Additionally, although these latches may be mechanical latches in some embodiments, they may also include electronic or magnetic latching means, such as an electromagnetic latch.

Also, although the actuator unit 120 is illustrated as including a pin mechanism 205 and mechanical connection links 255, 265 to operate the first and second latches 250, 260, in other embodiments the actuator unit may include a lever, a switch, a toggle, or a button with at least two seating positions. In addition, the actuator unit 120 may include servo motors to operate the securing latches where manipulation of the actuator unit does not provide the necessary movement to operate the securing latches, such as in the case where the actuator unit is an electronic button or switch.

Figure 5:
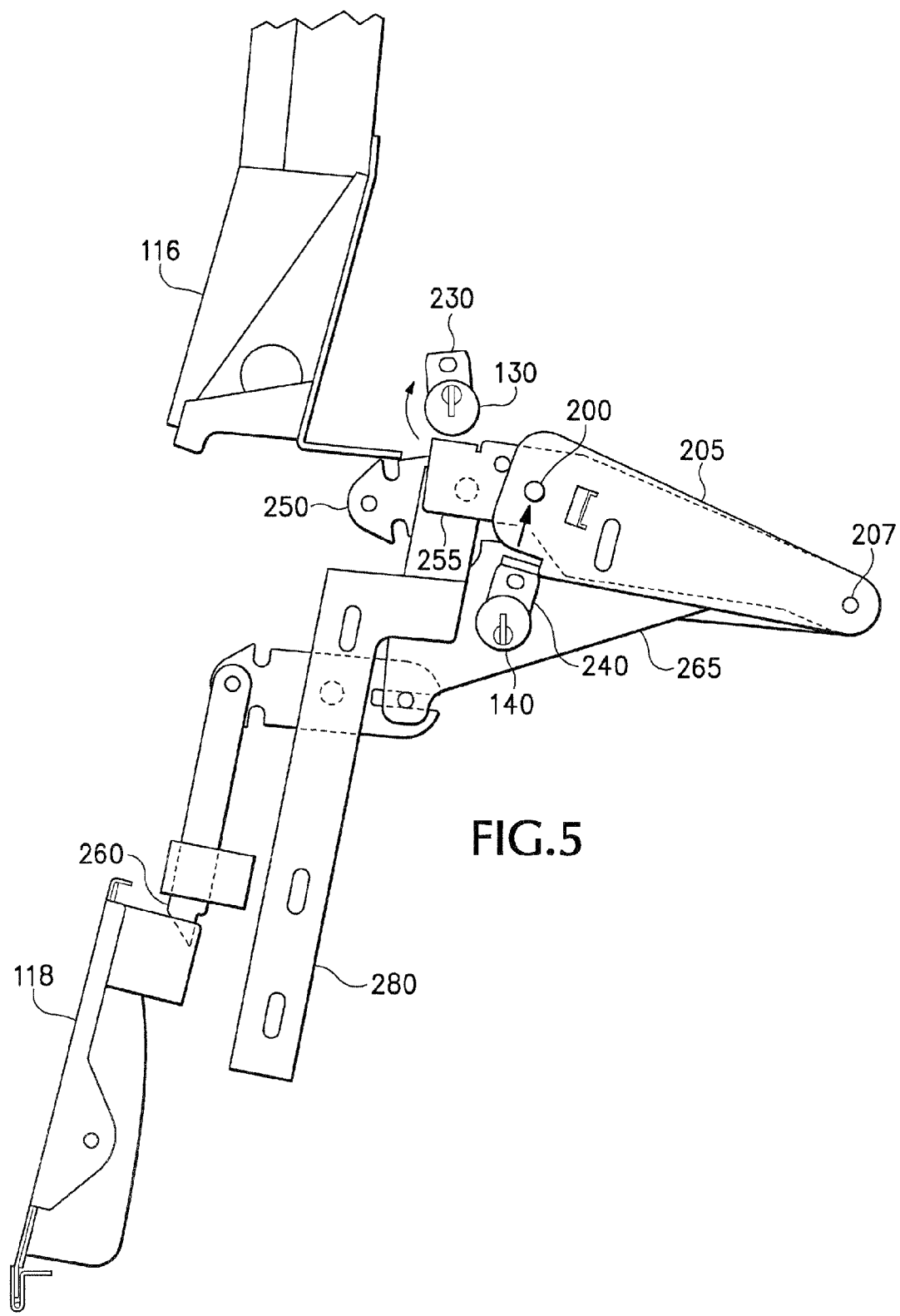
FIG. 5 illustrates another enlarged view of the example access system inside the cabinet of the gaming device illustrated in FIG. 3 where the example access system has been operated to open a first access door.

FIG. 5 illustrates another enlarged view of the example access system inside the cabinet of the gaming device illustrated in FIG. 3 where the example access system has been operated to open a first access door 116. Referring to FIG. 5, the first interface device 130 of this embodiment has been unlocked by having a first valid key (not shown) applied to it and being rotated clockwise (or counter-clockwise in other embodiments) as indicated by the arrow so that the first cam portion 230 no longer prevents the first connection link 255 and attached pin mechanism 205 from being manipulated in the first direction. Once the first interface device 130 has been unlocked, a gaming operator may push up on the pin 200 protruding through the slot 210 of the gaming cabinet 110 sidewall as shown in FIG. 3 as indicated by the arrow below the pin 200 so that the pin mechanism 205 pivots about the rotation point 207. As the pin mechanism 205 pivots about the rotation point 207, the first connection link 255 connected to the pin mechanism 205 moves upward and the first rocker latch 250 connected to the first connection link 255 is rotated downward due to a second pivot point (not visible) to unlatch the first access door 116. In other embodiments, the first connection link 255 may not be directly connected to the first rocker latch 250; rather the first connection link 255 may engage internal release member 280, which in turn may engage the first rocker latch 250. In other words, a gaming operator may manipulate the actuator unit 120 in a first manner to allow access to the first internal cabinet portion 112 (shown in FIG. 2).

Figure 6:
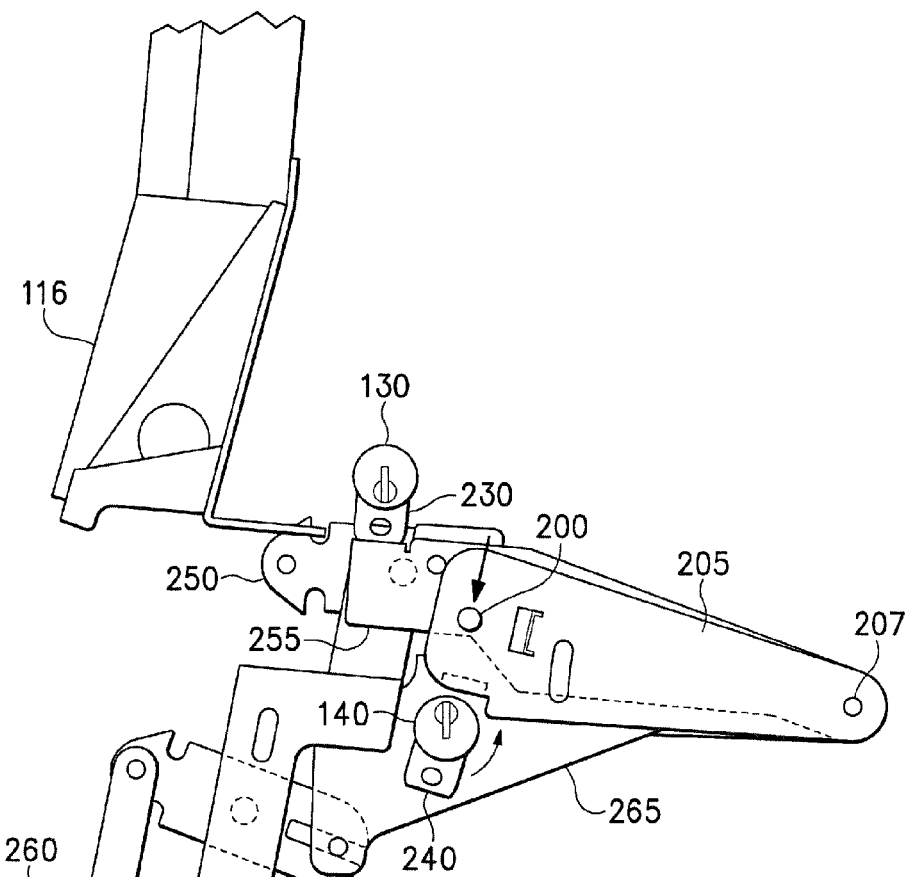
FIG. 6 illustrates another enlarged view of the example access system inside the cabinet of the gaming device illustrated in FIG. 3 where the example access system has been operated to open a second access door.

FIG. 6 illustrates another enlarged view of the example access system inside the cabinet of the gaming device illustrated in FIG. 3 where the example access system has been operated to open a second access door 118. Referring to FIG. 6, the second interface device 140 of this embodiment has been unlocked by having a second valid key (not shown) applied to it and being rotated counter-clockwise (or clockwise in other embodiments) as indicated by the arrow so that the second cam portion 240 no longer prevents the second connection link 265 and attached pin mechanism 205 from being manipulated in the second direction, Once the second interface device 140 has been unlocked, a gaming operator may push down on the pin 200 protruding through the slot 210 of the gaming cabinet 110 sidewall as shown in FIG. 3 as indicated by the arrow above the pin 200 so that the pin mechanism 205 pivots about the rotation point 207. As the pin mechanism 205 pivots about the rotation point 207, the second connection link 265 connected to the pin mechanism 205 moves downward and the second bar latch 260 connected to the second connection link 265 is rotated upward due to a third pivot point (not visible) to unlatch the second access door 118. In other words, a gaming operator may manipulate the actuator unit 120 in a second manner to allow access to the second internal cabinet portion 114 (shown in FIG. 2).

Figure 7:
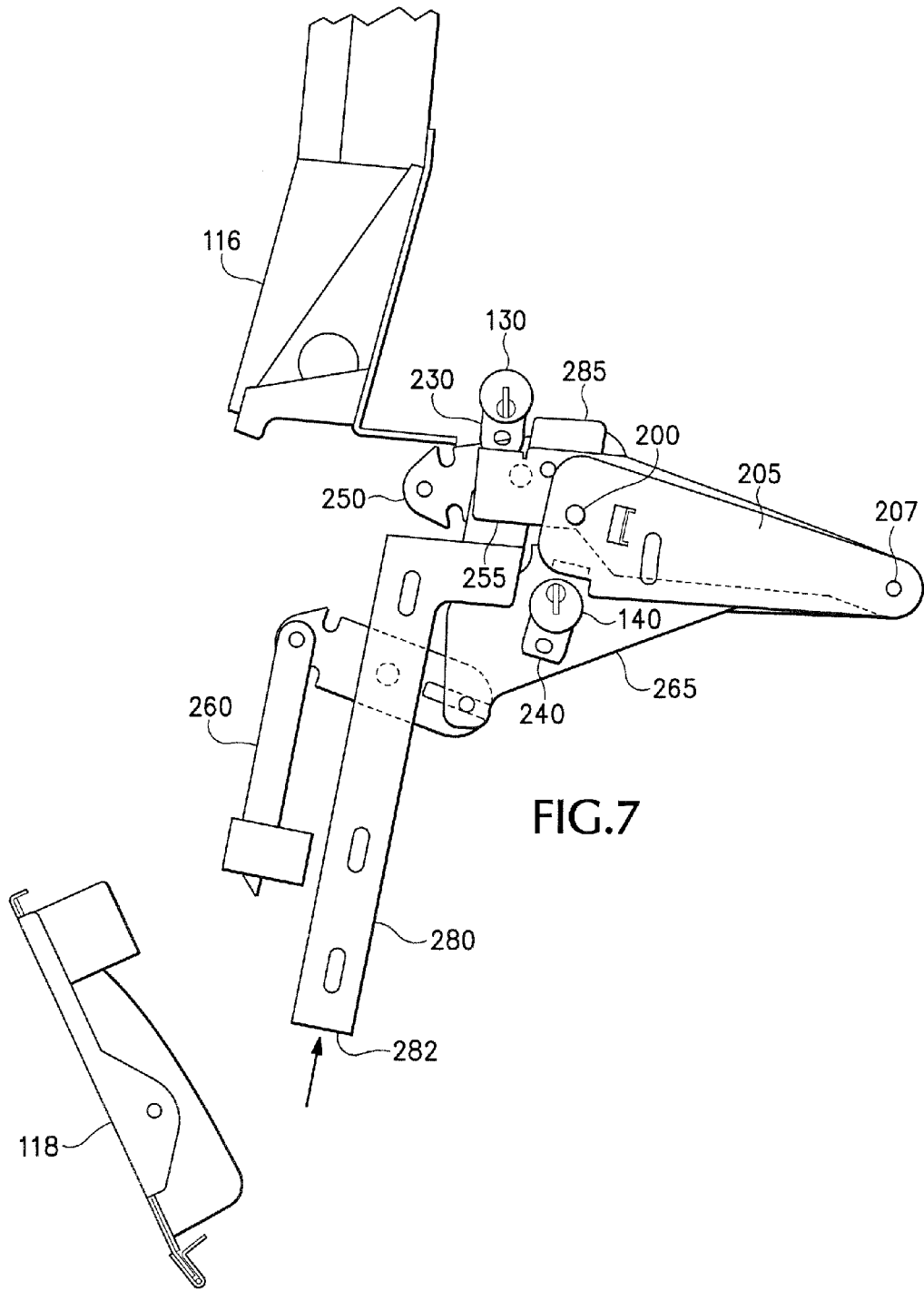
FIG. 7 illustrates another enlarged view of the example access system inside the cabinet of the gaming device illustrated in FIG. 3 where the example access system has been operated to open the first access door with an internal release member.

FIG. 7 illustrates another enlarged view of the example access system inside the cabinet of the gaming device illustrated in FIG. 3 where the example access system has been operated to open the first access door 116 with an internal release member 280.

Referring to FIGS. 2 and 7, the internal release member 280 includes a first end 282 protruding into the second internal cabinet portion 114 and a second end 285 that is connected to the first rocker latch 250. The internal release member 280 may be included to provide access from the second internal cabinet portion 114 to the first internal cabinet portion 112 without the need to unlock or disable the first interface device 130 or use the actuator unit 120. By providing this internal release member 280, embodiments of the gaming device 100 allow an operator with access to the higher security components in the second internal cabinet portion 114 to access the lower security components in the first internal cabinet portion 112 without having to carry around another key to unlock or disable the first interface device 130. Thus, the upper level casino employees and slot technicians need only carry a single key to unlock or disable the second interface device 140 to have access to both of the first and second internal cabinet portions 112, 114.

Operation of the internal release member 280 will now be described with reference to FIG. 7. Referring to FIG. 7, the second access door 118 has been opened in a manner illustrated in FIG. 6 and described above. Once access has been obtained to the second internal cabinet portion 114, the first end 282 of the internal release member 280 may be pushed upward by a gaming operator in a direction shown by the arrow in FIG. 7 to move the second end 285 of the internal release member 280 in a particular manner (here in a substantially upward manner). By moving the second end 285 of the internal release member 280 in an upward direction, the first rocker latch 250 rotates about the second pivot point (not visible) to disengage the first rocker latch 250 from the first access door 116 and provide access to the first internal cabinet portion 112. Further, because the second end 285 of the internal release mechanism 280 is directly connected to the first latch 250, the internal release member 280 may be operated to open the first access door 116 without unlocking or disabling the first interface device 130 or manipulating the pin mechanism 205. Thus, upper level casino employees or the slot technicians may gain access to the lower security components in the first internal cabinet portion 112 without a key to unlock or disable the first interface device 130.

Although the internal release member 280 is illustrated in a particular manner in the embodiment shown in FIGS. 4-7, the internal release member 280 may be structured in a variety of ways, such as including a button electrically coupled to a servomotor that unlatches the first latch 250.

Additionally, although the gaming device 100 illustrated in FIGS. 1-7 is shown as a substantially upright gaming machine, other embodiments of the gaming device contemplated by the present invention include slant top gaming machines, gaming machines enclosed in bar tops and tables (bar top machines), interactive and smart gaming tables, and other known gaming devices.

One such different style of gaming device is shown in the embodiment illustrated by FIG. 8, where FIG. 8 illustrates a gaming device according to another embodiment of the present invention. Referring to FIG. 8, a gaming device 500 housed in a slant-top gaming cabinet 510 may include first interface device 530, a second interface device 540, and an actuator unit 520. A first internal cabinet portion 512 can be accessed through a first access door 516 and the second internal cabinet portion 514 can be accessed through a second access door 518. In some embodiments the first internal cabinet portion 512 may include gaming components such as a bill acceptor/validator, bill acceptor cash box, player tracking card reader, ticket printer, cashless ticket paper, coin hopper, and monitor wiring. In these embodiments, the second internal cabinet portion 514 may include more critical game components, such as the gaming processor, local memory, and network communication circuitry. In other embodiments, the first interface device 530, second interface device 540, and actuator unit 520 may be located on the front surface of the gaming device 500 so that multiple gaming devices may be placed adjacent to each other without the need to leave space to access these components.

FIG. 9 illustrates a gaming device according to yet another embodiment of the present invention. Referring to FIG. 9, a gaming device 600 housed in a slant-top gaming cabinet 610 may generally include similar features to the embodiment illustrated in FIG. 8. However, the embodiment of the gaming device 600 illustrated in FIG. 9 has first and second access doors 616, 618 located and operated in different manners than those illustrated in the embodiment of the gaming device 500 illustrated in FIG. 8. Further, first and second interface devices (not visible) are housed in a single lock unit 635. In this embodiment, the first and second interface devices (not visible) may be operated by different keys to respectively open the first and second access doors 616, 618. In one example embodiment, the lock unit 635 may be an electronic key reader that includes circuitry for the first and second interface devices (not visible). In this example embodiment, different electronic key cards may unlock or disable one or both of the first and second interface devices (not visible) to open the first and/or second access door 616, 618 when the electronic key card is placed in proximity to the lock unit 635. Additionally, the embodiment of the gaming device 600 illustrated in FIG. 9 includes an actuator unit 620 that operates as an electronic button. Thus, when a proper key card is placed in proper proximity to the lock unit 635 and the electronic actuator button 620 is depressed, the access door corresponding to the proper security clearance encoded on the key card is opened. This may be done, for example, by servo motors releasing an access door latch in response to an electronic signal from the lock unit 635 and/or the electronic actuator button 620. In still yet another embodiment, the lock unit 635 and the actuator 620 may be housed in a single unit (not shown) such that a key card placed in proximity to the single unit is sufficient to unlock or disable one or both of the interface devices and actuate a signal to unlatch the proper corresponding access door. Again, in other embodiments, the single lock unit 635 and the actuator unit 620 may be located at the front of the machine for ease of access in multiple machine banks.

FIG. 10 illustrates a networked access system according to still another embodiment of the present invention. Referring to FIG. 10, a plurality of electronic gaming devices (EGM) 700 are connected via a network 710 to a server 720, which is in turn connected to a security database 730 configured to store security access information. Although a separate security access network 710, security server 720, and security database 730 may be used, the network 710, the server 720, and the security database 730 may be implemented on existing networks, servers, and databases currently used to track player activity or otherwise communicate between the gaming devices 700 and a centralized processor of the server 720.

In some embodiments of the networked access system, each of the gaming operators is issued a unique electronic key including circuitry structured with a unique identifier. Since some of the gaming operators or employees may have additional security clearance to access higher security components on the gaming devices 700, the unique key identifier can be associated with a particular security clearance. In other words, this security clearance can be controlled by data stored about the security privileges associated with a particular electronic key or gaming operator in a security access database 730. Thus, when a particular electronic key is put in proximity to a first or second interface device, or to a lock unit including the first and second interface devices, the gaming machine 700 contacts the server 720 to ascertain whether the gaming operator with that particular issued electronic key has sufficient clearance to access a particular internal portion of the gaming device 700. The server 720, in turn, compares the access request with the data stored about the security clearance of that particular electronic key and gaming operator in the security data base 730 and grants or denies the access request based on the comparison. If access is granted, the server 720 communicates back to the requesting gaming device 700 to acknowledge the access grant and the appropriate interface device unlocks or disables to allow the actuator unit to be operated providing access to the appropriate internal cabinet portion.

Further, to change security clearances or privileges for a particular gaming operator, only the data in the security database 730 connected to the server 720 need be modified since the server 720 grants or denies access to a particular electronic key upon a comparison with the security data on the security database 730. This allows quick changes in security clearances for special events like gaming tournaments or the like, or for temporary or permanent promotions of gaming operators. Further, if the electronic key is lost or an employee let go, the corresponding data in the security database 730 need only indicate that no access is to be allowed with that particular key. This may be advantageous in preventing unauthorized access to the gaming devices 700.

In other embodiments, biometric data may be stored in the security database 730 so that no electronic key is needed. In these embodiments, the biometric data input to one of the interface devices would be transferred to the server and compared to corresponding data in the security database 730 to determine access privileges.

In still other embodiments, the electronic keys may be part of a batch of keys all identified by a particular security level.

These embodiments are similar to the above embodiments shown in FIGS. 8 and 9 where the individual gaming device 700 validates or rejects a particular electronic key, except that it is the server 720 that validates or rejects a particular electronic key over the network 710. This may be advantageous where various games have different changing security clearances. Thus, if the security clearance of a $5.00 machine is different from the security clearances on a nickel machine, but the machines could have their minimum acceptable denominations changed, only the security data in the security database 730 connected to the server 720 need be changed instead of all of the security clearances at each of the gaming devices 700.

Having described and illustrated the principles of the invention in a preferred embodiment thereof, it should be apparent that the invention can be modified in arrangement and detail without departing from such principles. I claim all modifications and variation coming within the spirit and scope of the following claims.

The invention claimed is:

1. A gaming device comprising:
 a first internal cabinet portion;
 a second internal cabinet portion;
 a first interface device to secure access to the first internal cabinet portion;
 a second interface device to secure access to the second internal cabinet portion;
 an actuator unit structured to allow access to the first internal cabinet portion in response to a first valid key applied to the first interface device and to allow access to the second internal cabinet portion in response to a second valid key applied to the second interface device;
 a first door providing access to the first internal cabinet portion and a second door providing access to the second internal cabinet portion, the second door being on a same side of the gaming device as the first door;
 a first latch structured to engage the first door in a closed state;
 a second latch structured to engage the second door in a closed state;
 a pin release mechanism, the pin release mechanism structured to operate the first latch such that it disengages the first door when manipulated in a first manner and structured to operate the second latch such that it disengages the second door when manipulated in a second manner;
 wherein the first interface device transitions to an unlocked state when the first valid key is applied to the first interface device and wherein the second interface device transitions to an unlocked state when the second valid key is applied to the second interface device; and
 wherein the pin release mechanism is manipulated in the first manner by displacing the pin release mechanism in a first direction, and wherein the pin release mechanism is manipulated in the second manner by displacing the pin release mechanism in a second direction; and
 wherein the first interface device prevents the pin release mechanism from being manipulated in the first manner when the first interface device is in a locked state, and wherein the second interface device prevents the pin release mechanism from being manipulated in the second manner when the second interface device is in a locked state.

2. The gaming device of claim 1, wherein the first interface device includes a lock and a cam, the cam being operable to prevent the pin release mechanism from being displaced in the first direction.

3. The gaming device of claim 1, wherein the second interface device includes a lock and a cam, the cam being operable to prevent the pin release mechanism from being displaced in the second direction.

4. The gaming device of claim 1, further comprising an internal release member to allow access to the first internal cabinet portion from the second internal cabinet portion without use of the actuator unit and the first valid key.

5. The gaming device of claim 4, wherein the internal release member is structured to open the first latch.

6. The gaming device of claim 1, wherein the first internal cabinet portion provides access to first components of the gaming device including at least a bill validator and a player card reader.

7. The gaming device of claim 1, wherein the second internal cabinet portion provides access to at least a gaming processor.

8. A gaming device comprising:
 a first internal cabinet portion having a first security level;
 a second internal cabinet portion having a second security level, the second security level having an elevated level of access compared to the first security level, where the first internal cabinet portion and the second internal cabinet portion are accessible through a first device door and a second device door, respectively, and
 wherein the first device door is on a same side of the gaming device as the second device door;
 a first latch to retain the first device door in a closed position;
 a second latch to retain the second device door in a closed position;
 a pin actuator unit operable to release the first latch when actuated in a first direction after a first key with the first security level has been identified, and operable to release the second latch when actuated in a second direction after a second key with the second security level has been identified;
 a first security lock structured to prevent the pin actuator unit from being actuated in the first direction when the first security lock is in a locked state; and
 a second security lock structured to prevent the pin actuator unit from being actuated in the second direction when the second security lock is in a locked state.

9. The gaming device of claim 8, further comprising an internal release member operable to release the first latch without operating the pin actuator unit, the internal release member accessible through the second internal cabinet portion.

10. The gaming device of claim 9, wherein the internal release member is operable when the first security lock is in the locked state.

11. The gaming device of claim 8, wherein the first security lock includes:
 a lock mechanism having an unlocked state and a locked state; and
 a cam unit structured to prevent the pin actuator unit from being actuated in the first direction when the lock mechanism is in the locked state, and structured to allow the pin actuator unit to be actuated in the first direction when the lock mechanism is in the unlocked state.

12. The gaming device of claim 8, wherein the second security lock includes:
 a lock mechanism having an unlocked state and a locked state; and
 a cam unit structured to prevent the pin actuator unit from being actuated in the second direction when the lock mechanism is in the locked state, and structured to allow the pin actuator unit to be actuated in the second direction when the lock mechanism is in the unlocked state.

* * * * *